3,562,663
MODE AND "Q" SWITCH MECHANISM
FOR GASEOUS LASERS

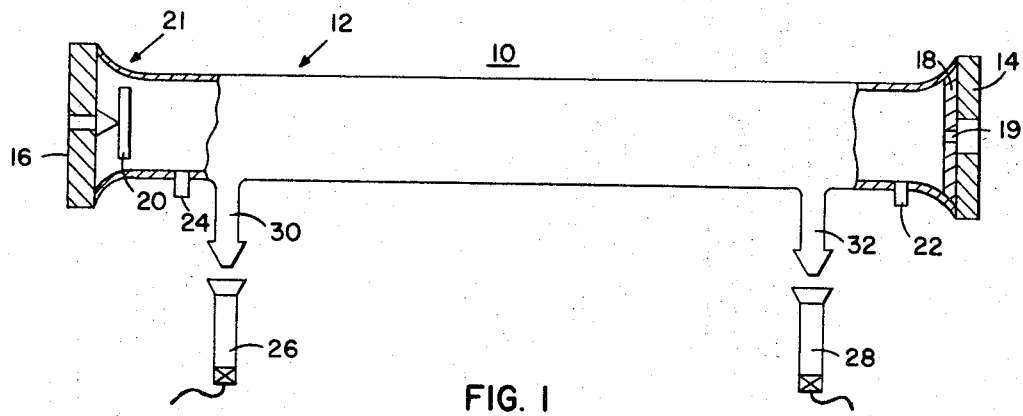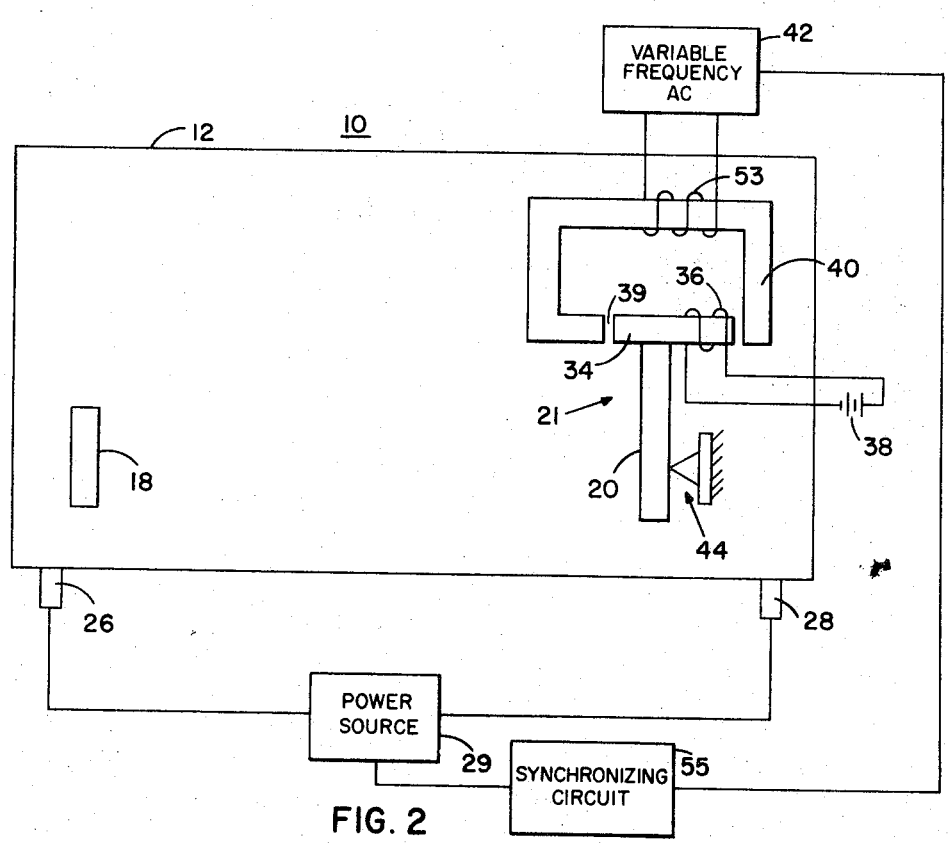

Charles M. Cason III, Guilford J. Hutcheson, Jr., Thomas A. Barr, Jr., and Ethel R. Hasty, Huntsville, Ala., assignors to the United States of America as represented by the Secretary of the Army
Filed Dec. 29, 1967, Ser. No. 694,434
Int. Cl. H01s 3/00
U.S. Cl. 331—94.5                              5 Claims

ABSTRACT OF THE DISCLOSURE

A gaseous laser including a cell enclosing a cavity having gases therein disposed for excitation for inversion of the population levels to provide stimulated emission. A mirror mounted at one end of the laser cell is disposed to reflect the stimulated emission to a partially transmitting second mirror at the other end of the cell for emission of the radiation of the cell. The first mirror is mounted for pivotal movement about its center (by about 10' to 20' of arc) to spoil the laser cavity optical alignment. The mirror motion is controlled by an electronically variable magnetic field to provide for high peak pulse power at about the average power level of continuous wave operation.

DEDICATORY CLAUSE

The invention described herein may be manufactured, used, and licensed by or for the Government for governmental purposes without the payment to us of any royalty thereon.

BACKGROUND OF THE INVENTION

"Q" switching is normally done with stimulated light from solid state lasers with Kerr cells, rotating mirrors and passive cells serving as a shutter to interrupt or block the beam path of a mirror. After a sufficient number of atoms are "pumped" to the upper level of excitation the shutter is quickly opened to produce a very high pulse of laser output. While this "shutter" approach works very well with solid state lasers, it is restricted in its application with gas lasers. "Q" switching or modulation in the device of the present invention is accomplished by "spoiling" the optical cavity, or mirror alignment, and not by interrupting the beam path.

One of the most critical requirements for laser oscillations is that the end reflectors forming the resonant cavity must have a high degree of parallelism to prevent reflecting radiation from being emitted randomly from the cavity. That is, if the cavity is non-resonant, laser oscillations cannot build up.

If stimulation is delayed and laser oscillation is prevented by non-parallelism of the cavity reflectors during most of the laser pumping cycle, the population difference between the upper and lower excitation states of the laser medium could be increased over that normally required for oscillation. Thus, if the cavity reflectors are rapidly made parallel at the moment when the laser medium has attained a maximum population inversion, which is substantially above the threshold population difference required for laser action, the output energy would be emitted in a single short duration burst of high peak power.

SUMMARY OF THE INVENTION

A gas laser including a cell charged with gases disposed for energization for population inversion thereof for producing stimulated emission. Means is provided for rapidly making the end reflective members parallel at the time at which the gases are at a maximum population inversion for emission of a burst of radiation of high peak power.

It is, therefore, an object of the present invention to provide a laser with means for "Q" switching by "spoiling" the laser cavity.

It is still another object of the present invention to provide such a laser cavity with means in which "Q" switching is accomplished by instantaneously making the laser cavity resonant at the instant the laser medium has attained a maximum population inversion.

Other objects and features of the present invention will be more readily apparent from the following detailed description taken in conjunction with the accompanying drawings.

BRIEF DESCRIPTION OF THE DRAWINGS

FIG. 1 is an elevational view illustrating a gas laser cell embodying the principles of my invention.

FIG. 2 is a diagrammatic view illustrating the principles of my invention.

DESCRIPTION OF THE PREFERED EMBODIMENT

Figure 3:
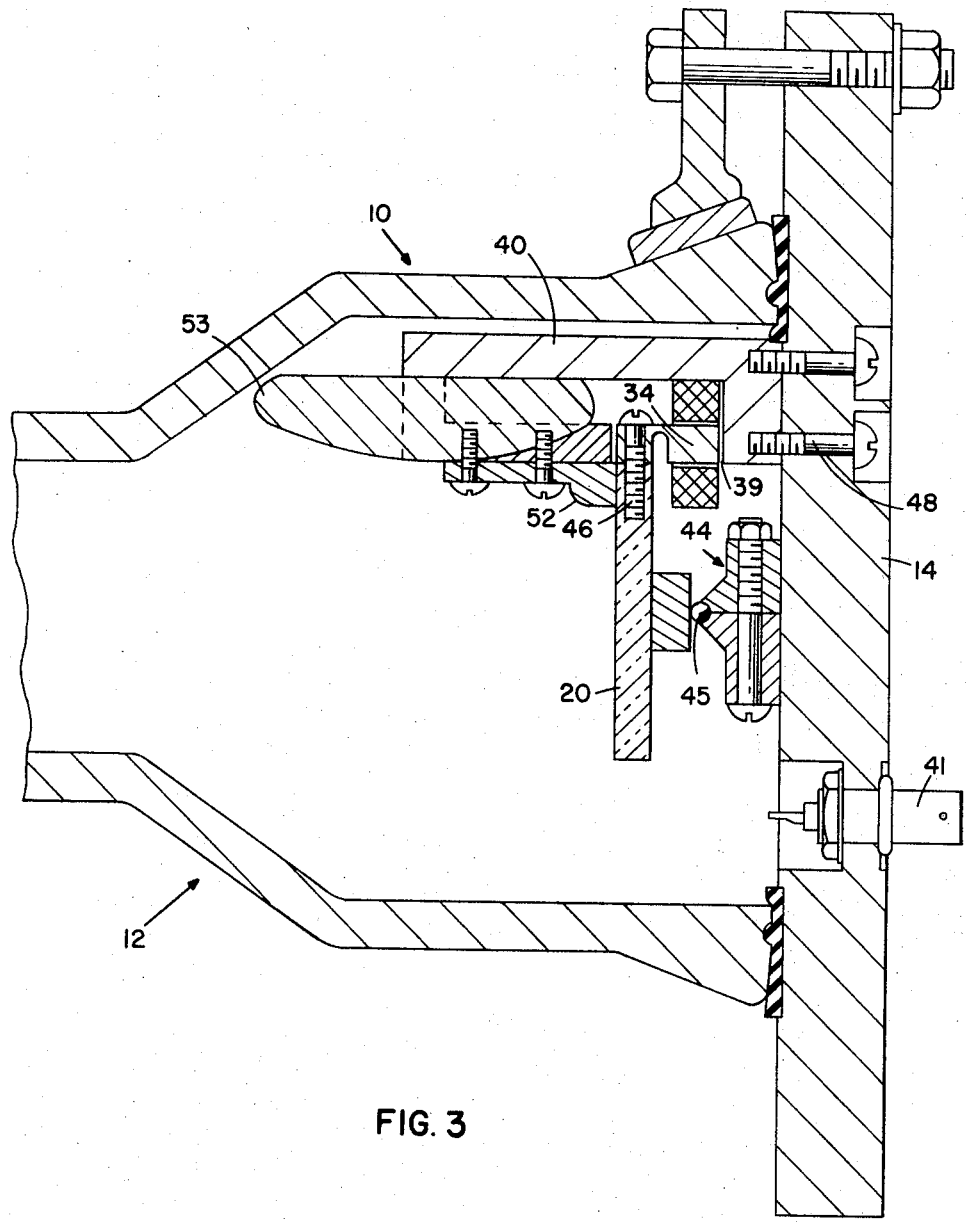
FIG. 3 is an elevational sectional view illustrating the mirror mounting mechanism of the present invention.

As shown in FIG. 1 a laser 10 is diagrammatically shown to include a housing or cell 12 having end members 14 and 16 enclosing a pair of end reflective members 18 and 20. Member 18 is rigidly secured in cell 12 while member 20 is mounted in a mechanism 21 for pivotal reciprocating movement in the cell. The cell typically includes an opening 22 adjacent one end thereof through which the interior of the cell may be evacuated and an inlet 24 adjacent the other end for charging the cell with the gases. The cell may include a pair of electrodes 26 and 28 disposed for attachment to a pair of crown glass seats 30 and 32 through which the gases in the tube are energized from power source 29. There are many ways in which the gases can be energized. For example, a photolysis flash, an RF discharge, etc., may be utilized.

Once the gases are energized, oscillation occurs and a beam is reflected between end reflecting members 18 and 20. Member 18 may be partially transmitting and reflecting or may be provided with a slot 19 therein through which energy is emitted from the cell.

As shown in FIG. 2, the mechanism 21 for pivotal movement of mirror 20 is generally shown to include pivotally mounted mirror 20 secured to an iron core 34 which is polarized by coil 36 connected to a D.C. source 38. An iron yoke 40 completes the magnetic loop with core 34 and is also provided with about .030 inch air gap 39 for motion. Yoke 40 is connected to a variable frequency A.C. source 42 by coil 53.

Mechanism 21 is more clearly shown in FIG. 3 wherein a mirror support member 44 is shown secured to end plate 16. Mirror 20 is pivotally secured to member 44 as at 45. Core 34 is secured to mirror 20 by means, such as screws 46, and is mounted in yoke 40 for movement therein. Yoke 40 is secured to end plate 14 by screws 48. Core 34 is electrically connected to D.C. source 38 and yoke 40 is electrically connected to variable frequency A.C. source 42 by leads which extend through a BNC feed through 4 mounted in plate 14. The leads are omitted in FIG. 3 for clarity. A variable reluctance pickoff 52 may be utilized to measure core movement, if desired.

In operation, with the gases of the laser in the excited state, coil 36 of iron core 34 is energized by D.C. source 38 to an induction of approximately 10,000 gauss. Yoke 40 is variable frequency A.C. excited by source 42 and by sufficient ampere turns to develop 10,000 gauss. The interaction of the A.C. magnetic field with the D.C. field at air gap 39 will move mirror 29 about support member 44 in pivotal reciprocating motion by about 10' to 20' of arc.

Synchronization of mirror alignment with maximum population inversion of the gases in the cell is accomplished by providing a synchronization circuit 55 which supplies signals to variable frequency A.C. source 42 to move mirror 20 in alignment with mirror 18 at predetermined time intervals. This amounts to an amplitude control which is frequency dependent. The predetermined time interval is selected so that the mirrors are in parallel relation at the instant when the gases have attained a maximum population inversion. During operation, when mirrors 18 and 20 are aligned, the impedance of laser tube 12 is at a minimum after maximum discharge occurs. Therefore, with minimum impedance in the pumping circuit, power source 29 has a maximum current drain. When mirror 20 moves out of perfect focus, laser tube impedance to pumping currents increase because of the non-resonance of the cavity. Thus, current flow from source 29 decreases. Synchronizing circuit 55 is connected to the power source to sense changes therein. Thus, the synchronization circuit senses the impedance changes because of the current variations in the power source and transmits signals indicative of these variations to the variable frequency A.C. source 42. Source 42 receives these signals and responds, accordingly, to increase or decrease its output frequency. This amounts to an amplitude control of A.C. source 42 by synchronization circuit 55 in response to the frequency of the varying current of the power source output.

Although the example described utilizes a gaseous laser medium having a flat mirror pivoted at its center, the invention is not to be limited to only this illustrative embodiment. Obviously, many modifications may be resorted to by one skilled in the art. For example, the electromagnetic mirror positioning mechanism may be utilized with other than gas lasers, the mechanism need not be completely enclosed in the laser cell, nor is it necessary to utilize only a flat moveable mirror, as a wedge shaped mirror crystal may be successfully utilized. Thus, it is desired that the present invention shall not be limited except insofar as what is set forth in the spirit and scope of the following claims.

We claim:
1. A laser comprising a cell having a gaseous laser medium therein; means for pumping said medium for producing a population inversion therein; a first reflector fixed to one end of said cell; a second reflector pivotally mounted at the other end of said cell; electromagnetic means disposed for pivotal movement of said second reflector for displacement thereof to a position parallel to said first reflector, said electromagnetic means including a yoke having a first plurality of windings thereground, a core member mounted in said yoke in spaced relation therein and having said second reflector secured thereto, a second plurality of windings carried about said core member and connected to a D.C. source for energization thereby, whereby interaction of an A.C. magnetic field in said first windings with a D.C. magnetic field in said second windings produces movement of said core member in said yoke and thus movement of said second reflective member for substantially parallel alignment with said first reflecting member responsive to population inversion of said medium; and, means for actuating said electromagnetic means responsive to said population inversion.

2. Apparatus as in claim 1 wherein said means for actuating said electromagnetic means includes a power source connected to said cell for energization of said gases for the population inversion; a synchronizing circuit connected to said power source to receive signals therefrom and to emit corresponding signals; a variable frequency A.C. source connected to said synchronization circuit to receive said emitted signals from said synchronizing circuit and for energizing said first plurality of windings around said yoke for displacement of said second reflector in parallel relation with said first reflector simultaneously with maximum population inversion of said medium.

3. Apparatus as in claim 2 including support means carried in said cell for pivotal support of said mirror therein.

4. Apparatus as in claim 3 wherein one of said reflective members is partially reflective and partially transmitting for reflection of a laser beam between said end reflective members and for transmission of said beam from said cell responsive to alignment of said reflective members.

5. Apparatus as in claim 3 wherein said fixed reflective member is provided with a slit therein for emission of laser energy from said cell responsive to the maximum population inversion.

References Cited

UNITED STATES PATENTS

| 2,630,736 | 3/1953 | Beitz | 356—83 |
| 3,315,177 | 4/1967 | Benson | 331—94.5 |
| 3,393,374 | 6/1968 | Krumboltz | 331—94.5 |

OTHER REFERENCES

"Optical Maser Action in Ruby" by T. H. Maiman, British Comm. and Electronics, vol. 7, No. 9, pp. 674–5.

RONALD L. WIBERT, Primary Examiner

P. K. GODWIN, Assistant Examiner

U.S. Cl. X.R.

350—285, 288